United States Patent

Barnard

[11] Patent Number: 5,547,623
[45] Date of Patent: Aug. 20, 1996

[54] METHOD FOR CONTINUOUS SPINNING AND PYROLYSIS OF CERAMIC FILAMENTS FROM A RESIN

[75] Inventor: Thomas D. Barnard, Midland, Mich.

[73] Assignee: Dow Corning Corporation, Midland, Mich.

[21] Appl. No.: 396,160

[22] Filed: Aug. 21, 1989

[51] Int. Cl.$^6$ .............................. C04B 40/00; D01C 5/00
[52] U.S. Cl. .............................. 264/82; 264/83; 264/29.2; 264/63; 264/65; 428/113
[58] Field of Search .............................. 264/83, 82, 29.2, 264/56, 63, 65; 428/113

[56] References Cited

U.S. PATENT DOCUMENTS

| | | | |
|---|---|---|---|
| 3,555,138 | 1/1971 | Bryan, Jr. | 264/83 |
| 3,853,567 | 12/1974 | Verbeek | 106/44 |
| 4,310,651 | 1/1982 | Baney et al. | 264/85 |
| 4,312,970 | 1/1982 | Gaul, Jr. | 526/279 |
| 4,340,619 | 7/1982 | Gaul, Jr. | 264/29.2 |
| 4,342,712 | 8/1982 | Yajima et al. | 264/63 |
| 4,399,232 | 8/1983 | Yajima et al. | 501/38 |
| 4,482,689 | 11/1984 | Haluska | 264/29.2 |
| 4,535,007 | 8/1985 | Cannady | 264/29.6 |
| 4,693,914 | 9/1987 | Foley | 427/255 |
| 4,810,443 | 3/1989 | Barnard | 264/29.1 |
| 4,948,763 | 8/1990 | Hayashida et al. | 501/95 |

Primary Examiner—Peter A. Nelson
Attorney, Agent, or Firm—Roger E. Gobrogge

[57] ABSTRACT

A resinous organosilicon preceramic polymer is melt spun into filaments which are rapidly cured, continuously gathered into a thread, and pyrolyzed in a continuous process to form ceramic fibers which may be either solid or hollow. The preferred preceramic polymer is hydridopolysilazane and the preferred curing agents are $Cl_2$, HCl, HBr, thionyl chloride and trichlorosilane, followed by treatment with an atmosphere containing water vapor.

19 Claims, 2 Drawing Sheets

METHOD FOR CONTINUOUS SPINNING AND PYROLYSIS OF CERAMIC FILAMENTS FROM A RESIN

RIGHTS OF THE GOVERNMENT

This invention was made with Government support under a Prime Contract No. F33615-83-C-5006 awarded by the Department of Defense (DOD). The Government has certain rights in this invention.

BACKGROUND OF THE INVENTION

The present invention relates generally to methods for forming ceramified filaments from a resin and more particularly to methods for continuously processing a resinous organosilicon polymer by melt spinning into a filament followed by crosslinking and pyrolysis into a ceramic fiber in a one-step process.

Certain resinous organosilicon polymers are useful as precursors for forming ceramic fibers having a composition consisting essentially of silicon and at least one of nitrogen and carbon. These ceramic fibers are useful., for example, in composite, high temperature-resistant materials, e.g., materials made into jet engine parts.

The resinous organosilicon polymer typically contains silicon, hydrogen, nitrogen and carbon, with oxygen present as an impurity. It may also contain certain additives, such as chlorine, boron, titanium or aluminum. This resin is typically processed into a fiber by melting solid resin and then melt spinning the molten resin through a conventional spinning device called a spinnerette, to form one or more filaments which are gathered into a fiber tow. Typically this tow is taken up on a spool or reel or gathered into a loose pile. The fiber is then subjected to a cure process following which the cured fiber is subjected to a pyrolyzing operation which typically drives off the hydrogen and some of the nitrogen, silicon, carbon and oxygen as gas or vapor, to produce the ceramic fiber. Due to the marked differences in the processing speeds at which pyrolysis could heretofore be carried out in contrast with the high process speed heretofore required for successful fiber spinning, the fibers had to be wound onto a spool or otherwise gathered and later pyrolyzed in accordance with a discontinuous process which necessarily lacked efficiency.

A more detailed description of a prior art process for forming a ceramic fiber from a resinous organosilicon polymer is contained in an article by LeGrow et al, "Ceramics From Hydridopolysilazane", *Am. Ceram. Soc. Bull.,* 66[2]: 363–67 (1987), and the disclosure thereof .is incorporated herein by reference. The use of preceramic polymers is also described in my U.S. Pat. No. 4,810,443 issued Mar. 7, 1989, which disclosure is also incorporated by reference.

Various curing procedures and curing agents of the prior art are described in U.S. Pat. Nos. 3,853,567, 4,535,007, 4,399,232, 4,310,651, 4,312,970, 4,342,712, 4,482,689, 4,340,619, and 4,693,914.

In the prior art, the preparation of ceramic fibers from preceramic polymer resins involved several separate, discontinuous steps. These included fiber spinning, fiber cure, winding of the fiber on a bobbin, transfer of fiber to a pyrolysis operation, and rewinding of the resultant ceramic fiber for further processing. These separate steps represent excessive handling which is costly and can also induce damage to the fibers at the various process steps.

SUMMARY OF THE INVENTION

The present invention provides for integration or coupling of the spinning, curing, and pyrolysis steps, thereby simplifying the process to produce ceramic fibers from a preceramic resin. The present invention achieves this integration by carefully matching the rates of individual steps, while allowing for the fiber shrinkage which occurs during pyrolysis. Thus, a spinning step conducted at a speed heretofore believed to be too slow to be practical, ie., at speeds below 100 meters/minute, and preferably below 40 meters per minute, is coupled with a very rapid curing or crosslinking step, which takes place within a few seconds, or less, and a pyrolysis step, which is operated at a somewhat slower linear speed to allow for fiber shrinkage during pyrolysis, to achieve a continuous overall process. Tows consisting of solid ceramic filaments, or substantially of hollow ceramic fibers can be formed under appropriate pyrolysis temperature conditions. Generally, hollow filaments are formed by using temperatures in excess of those leading to filaments with solid cross-sections. Additionally, the invention provides a novel curing procedure wherein the filaments are cured sequentially by a halogen-containing chemical agent followed by a water vapor cure. The invention further provides a novel curing procedure wherein the halogen-containing agent is chlorine gas.

This process in its simplest form consists of forming fibers, rendering these fibers infusable through some means, then continuously feeding these fibers through one or more furnaces to pyrolyze them into a ceramic form. These furnaces are inerted in the case of air-sensitive materials and the inert gas can be heated to aid in the control of the pyrolysis process in the furnaces. The furnaces can be mounted vertically or horizontally.

When a horizontal configuration is used a speed controlled set of rollers is used to draw the fibers and feed them into the furnaces at the proper speed. At the exit of the furnaces a second set of speed controlled rollers is used to pull the fibers through the furnace. The speed of the second set of rollers must be carefully controlled to allow for the proper tension and shrinkage of the fiber. The relative speeds of the first and second sets of rollers are adjusted to so that the fibers do not touch the furnace walls. From the second set of rollers the pyrolyzed ceramic fibers are wound onto a spool with the winding speed controlled by the tension between the rollers and the winding spool. An advantage of this system is the decrease in handling of the fragile resin fibers and the quality and cost improvements derived from the decreased handling.

Depending on the pyrolysis conditions used, and the requirements of specific applications for the ceramic fiber, the fiber may be utilized in the form in which it is produced, or it may be subjected to additional heating, or densification steps to increase its density and elastic modulus.

Other features and advantages are inherent in the method claimed and disclosed or will become apparent to those skilled in the art from the following detailed description in conjunction with the accompanying diagrammatic drawings.

DETAILED DESCRIPTION

Figure 1:
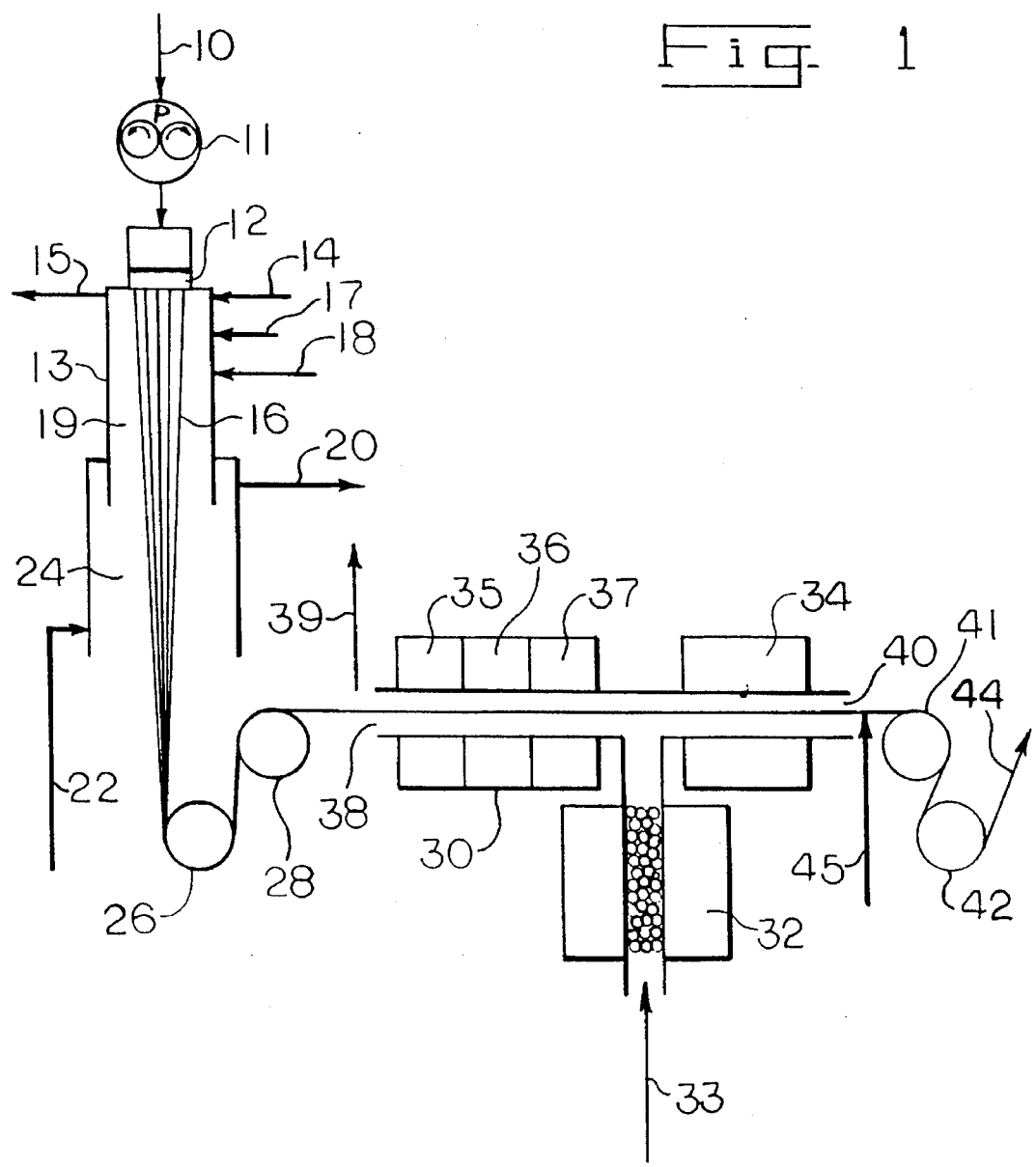
FIG. 1 is a flow diagram illustrating an embodiment of a method in which the pyrolysis step is carried out in a horizontal orientation in accordance with the present invention; and, FIG. 2 is a flow diagram illustrating another embodiment of the invention in which the pyrolysis step is carried out in a vertically oriented path.

Referring initially to FIG. 1, indicated generally at 10 is a resinous organosilicon polymer in liquid form. The molten polymer is fed by the metering pump 11 into spinnerette 12, the output end of which is encased in a shroud 13 preferably glass, The spun filaments are blanketed and cooled within shroud 13 by a stream of gas, for example nitrogen, indicated by arrow 14. Pump 11 and spinnerette 12 are heated to a temperature above the melting point of the resinous organosilicon polymer. The melt spinner or spinnerette 12 forms the molten resin into a multiplicity of filaments 16. Spinnerette 12 is of a commercially available, conventional type device which is commonly preceded by a filtration pack.

Depending on the nature and reactivity of the preceramic polymer,, the atmosphere surrounding fibers 16 may be required to be inert, preferably by use of a nitrogen or argon stream 14. Other atmospheres may be employed depending on the particular polymer. The spinning temperature and other processing conditions will also vary with the composition of the resinous organosilicon polymer. In addition to being above the melting point of the resinous organosilicon polymer, the temperature in zone 10, 11, 12 must be below the temperature at which the molten polymer decomposes, but the temperature must also be high enough to impart to the molten polymer sufficient flowability to impart to the molten polymer a viscosity sufficiently low to permit melt spinning of the molten polymer.

The preferred polymer used in the process of this invention is hydridopolysilazane (HPZ). The polymer is melted and degassed in a chamber before metering to the spinnerette 12 using a melt pump 11. As the polymer extrudes through spinnerette 12 it is cooled by the flow of inert gas 14. This assists in stabilizing the spinline and prevents the polymer from fouling the face of the spinnerette. This cooling gas is removed at 15. Generally it is preferred to spin approximately 50 to 500 individual filaments and to subsequently gather them together into a multifilament tow. An inert gas is also introduced at 17. An initial cure gas 18 is injected just below the inert gas cooling zone and controlled at a specific concentration, in zone 19 where gas flow to provide uniform mixing is maintained. Gas 18 is then withdrawn at point 20. A second cure gas 22, when used, is introduced into second cure zone 24 as pictured in FIG. 1 to complete the cure and is removed at point 20. Gas flow in zone 24 is also maintained to provide good mixing. In the horizontal configuration of FIG. 1 the fibers are gathered into a tow with a guide (not shown) and fed through a set of rollers 26 and 28 that controls the drawing speed.

The fibers then enter a set of furnaces 30 and 34 where they are pyrolyzed, through entrance 38. The first furnace is used to drive off most of the pyrolysis by-products that could interfere with ceramification at the higher ceramification temperatures. Furnace 30 is preferably provided with three or more separately controlled heating zones 35, 36 and 37. Entrance opening 38 allows for escape of gases from the furnace and facilitates removal of debris, if any, that accumulates from the fiber tow. The three zones are maintained at desired temperatures, often about 600° to 1000° C. The furnace temperatures generally are increased starting from the inlet 38 successively through zones 35, 36, and 37. The first furnace 30 is provided with an inert atmosphere such as argon or nitrogen 33 which can be heated, for example in furnace 32. Arrow 39 indicates a discharge vent for discharge of nitrogen along with pyrolysis by-products. The relative diameters of openings 39 and 40 are selected to obtain optimum gas flow patterns in the furnaces. Furnace 34 consisting of one or more zones is maintained at a higher temperatures, for example, 1200° C. to 2000° C. The fiber exiting the furnaces is then fed through rollers 41 and 42 that are driven at a controlled speed to allow for the shrinkage of the fibers. From the driven rollers 41 and 42 the fiber tow is taken up on a winder 44, with the speed controlled by the fiber tension. If it is desired, optionally, to add a sizing coating to the ceramified tow, such may be added as indicated by arrow 45.

Figure 2:
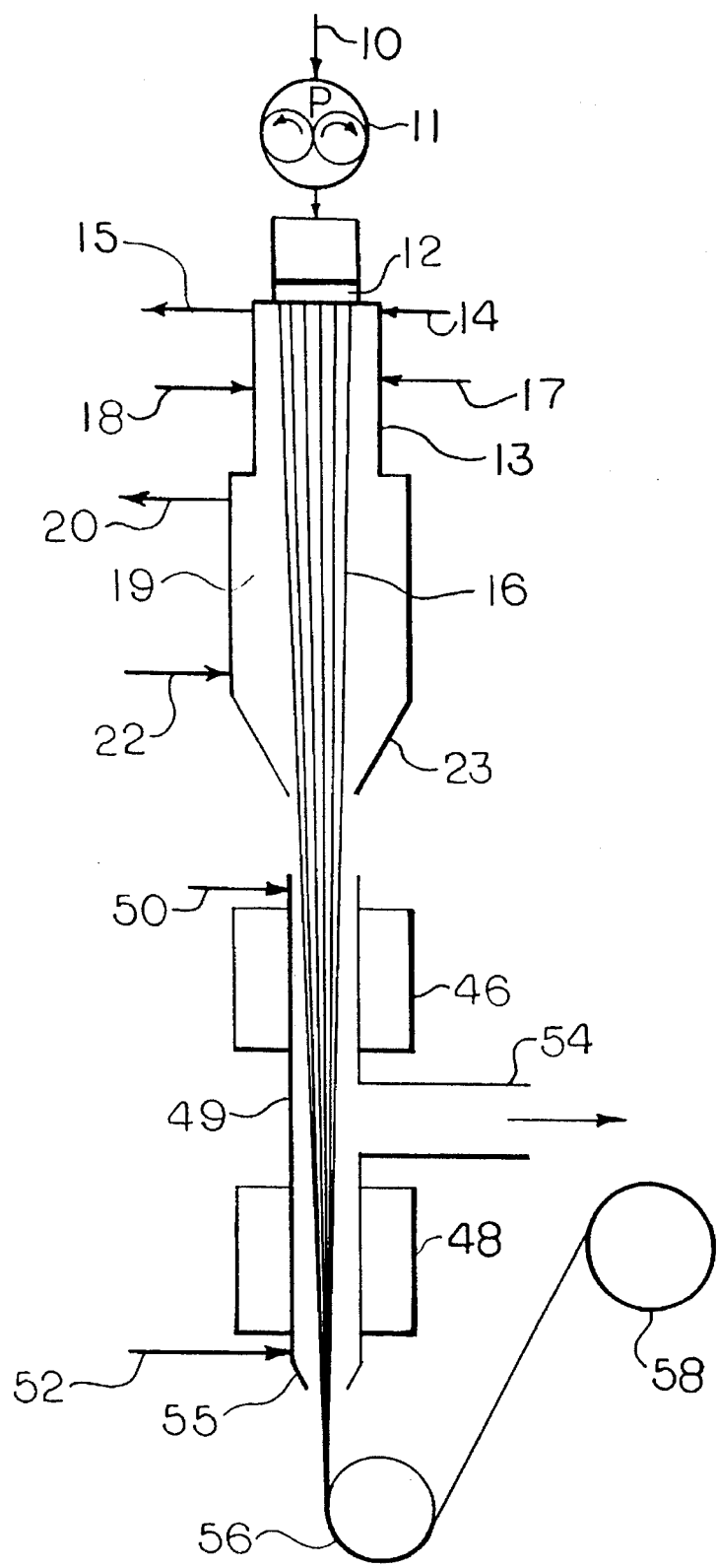

In the embodiment shown in FIG. 2, the foregoing description applies to items numbered 10 through 22, inclusive. The lower end 23 of the curing column formed by shroud 13 may be of a reduced diameter as shown in FIG. 2 and connected to the pyrolysis furnaces that are mounted vertically. The furnaces are joined to control the gas flows in the pyrolysis furnaces. A slight gas pressure must be exerted to overcome the "chimney effect". Pyrolysis furnaces 46 and 48 are arranged to provide for downward travel of tow 16 in a vertical path through the furnaces. An enclosing column, for example of ceramic material 49 is preferably provided in order to allow for better control of the atmosphere during pyrolysis. For example streams 50 and 52 of an inert gas such as nitrogen can be introduced near the top and bottom of column 49 and removed along with pyrolysis gases through vent 54. Outflow of gases through the bottom of column 49 may be restricted by use of a reduced diameter discharge end 55. The ceramified tow is then passed over roller 56 and wound onto a spool by winder 58.

Additional information on HPZ, its composition preparation and properties is contained in said LeGrow et al. publication identified above under the subheading "Background of the Invention" and in Cannady U.S. Pat. No. 4,540,803, the disclosures of which are incorporated herein by reference.

Other resinous organosilicon polymers useful as precursors for forming ceramic fibers may also be employed in the method of the present invention, and some of these other polymers are identified herein.

Cannady U.S. Pat. No. 4,535,007, issued Aug. 13, 1985 discloses an alternative cure system. Other preceramic formulations which can be processed into fibers are disclosed in the chapter entitled "Preceramic Polymers" by G. Chandra and R. Baney in the "Encyclopedia of Polymer Science and Engineering" Vol. 13, 2nd Edition, Mark, Bikales, Overberger, and Menges, editors, J. Wiley & Sons, 1988. Said disclosures are incorporated herein by reference.

The method of the present invention is also useful with other, similar preceramic polymers which do not contain silicon. For example, polymers which are convertible to boron nitride ceramics may also be advantageously processed by the method of this invention. All that is required is that the polymer be meltable, and the processing of that polymer with the method of the present invention would be the equivalent of processing organosilicon polymers with the same method. Non-meltable polymers may be dissolved and spun if appropriate modifications to the spinning section are made.

Referring again to the HPZ, a temperature in the range 150°–250° C. may be employed within zone 12. Temperatures in this range are above the melting point of the resinous organosilicon polymer and would impart to the polymer the desired viscosity, e.g. approximately 100 poise. These resinous organosilicon polymers are relatively easy to handle in the molten condition. A process for use of a polymer dissolved in a solvent is set forth in U.S. Pat. No. 4,810,443, the disclosure of which is incorporated herein by reference.

A procedure which has heretofore been utilized for producing a molten resinous organosilicon polymer prior to melt spinning is to take solid resinous organosilicon polymer, the form in which that polymer is usually provided by the manufacturer thereof, break or crush the solid polymer into smaller pieces, and feed the smaller polymer pieces to a heated, screw type extruder, the output from which serves as the feed material to the melt spinning operation.

An alternative procedure involves compacting the smaller polymer pieces into a solid rod, typically employing pressure and elevated temperature and then mechanically forcing the solid rod against a heated plate to form molten polymer for melt spinning.

In a further alternative procedure, which is preferred if the particular polymer possesses adequate thermal stability, heat is applied to the polymer in a closed container to effect melting. A vacuum may be applied to aid in degassing of the polymer. The container of molten polymer then serves as a reservoir of feed material for the spinning operation.

In order for the spun fiber to survive pyrolysis with retention of its shape, i.e., without remelting into a formless mass, the fiber, or at least an outer shell, must be cured or cross-linked. When adequately cured, the fiber will retain its shape long enough for thermal cure of the interior of the fiber during the early phase of the pyrolysis process, so that the fiber will then retain its shape during the pyrolysis process which converts it into a ceramic form.

Numerous forms and types of cure chemistry for use with preceramic polymers are known. For the present invention to be operable, it is necessary that the cure step be fast enough so that sufficient cure takes place in the relatively short exposure (generally approximately one second) that the polymeric fiber undergoes while passing through the cure portion of the process. Cure systems that have been found to be suitable for curing preceramic polymers are electromagnetic and ionizing radiation and chemical. In some instances the cure chemistry involves a sequence of reactions and the use of two sequentially applied chemical agents is necessary. HPZ fibers can be cured with the necessary rapidity by passing the fibers through an atmosphere of a gas selected from the group consisting of Cl2, HCl, HBr, thionyl chloride and trichlorosilane, followed by exposure to an atmosphere containing water vapor in an amount sufficient to complete the cure. Heretofore assessment of the degree of cure of HPZ polymer fibers by halogen-containing compounds has been based on the degree to which the filaments have been rendered insoluble in solvents such as toluene, or the degree to which they survive subsequent pyrolysis without loss of shape. It has now been discovered that with halogen-containing compounds the actual cure process possesses a greater degree of complexity than has heretofore been realized. Under anhydrous conditions such a cure is inadequate. Additional cure, either by deliberate exposure to moisture in a batch mode, or by adventitious exposure to moisture during handling, was generally found necessary to complete the cure to the extent that the fibers would survive pyrolysis. Since it is not practical to depend on adventitious cure, particularly in the short processing time available in a continuous process, it is advisable to provide a second cure gas, to wit, water vapor, in an amount sufficient to complete the cure, generally at least 0.05 per cent by weight, when a halogen-containing initial cure gas is used.

It has further been discovered that the process of this invention can be employed to produce hollow fibers. The proper conditions for formation of such fibers are obtained by observing the temperature at which the furnace is too hot to produce useful fibers due to the fact that the hot fibers will either explode or degenerate in the furnace. The temperature is then reduced from this level to nearly the highest temperature at which fibers are obtainable. At such temperatures, it has been found that pyrolysis occurs so rapidly that gases become trapped within the fibers which are thus formed with hollow interiors.

The following examples further illustrate but are not intended to limit the present invention.

EXAMPLE 1

HPZ polymer was melted and degassed in a chamber before metering to the spinnerette using a melt pump at 1.2 grams per minute. The metering pump was maintained at a temperature of 150° C., and the spinnerette temperature was varied between 130° and 150° C., as needed, to maintain a stable spinline. The polymer was extruded through a spinnerette containing 200, 0.35 mm. diameter holes. As the polymer extruded out of the spinnerette it was cooled with nitrogen at a cross velocity of one to three feet per second in order to stabilize the spinline and prevent the polymer from fouling the face of the spinnerette. The spinline was enclosed with a glass shroud as shown in FIG. 1 and enough nitrogen was fed in, near the spinnerette, to maintain a linear velocity of 9 to 25 centimeters per second down the column. This was done to maintain an inert atmosphere at the exit of the spinnerette where the fibers were drawn down. HCl gas was injected just below this section and would interfere with the draw down if it moved into the upper cooling zone. The HCl gas was injected and controlled at a concentration of about 5 percent-seconds (where percent seconds is the product of the gas concentration in weight per cent and the residence time of the fibers in the contact zone in seconds) and then withdrawn along with the cure gas from the second cure zone as pictured in FIG. 1. Cure gas (#2) which consisted of water vapor at 1%-sec., was injected at the bottom of the column and flowed up at 9 to 15 centimeters per second. In the horizontal configuration of FIG. 1 the fibers were gathered into a tow with a guide and fed through a set of rollers that controlled the drawing speed at 27 meters per minute. The fibers then entered a set of furnaces where they were pyrolyzed. The first furnace was used to drive off most of the pyrolysis by-products that could interfere at the higher ceramification temperatures. The first furnace contained a 0.9 meter long by 76 mm. diameter tube with three separately controlled heating zones. A 50 mm. entrance opening facilitated removal of debris that accumulated from the fiber tow. The three zones were maintained at about 650°, 700°, and 900° C. starting from the inlet. The nitrogen preheating oven was maintained at about 1150° C., with a nitrogen flow of 1 liter per second. The second furnace contained a 50 mm. tube with an exit hole diameter of 20 mm. This furnace had a 30 cm hot zone and was maintained at 1400° C. The fiber exiting the furnaces was then fed through rollers driven at a controlled speed to allow for the shrinkage of the fibers of about 30 percent. From the driven rollers the fiber tow was taken up on a winder with the speed determined by the fiber tension. The fibers obtained typically are of an oval cross-section.

EXAMPLE 2

A hydridopolysilazane polymer was spun into filaments using the same spinning equipment and spinning conditions as set forth in Example 1. Chlorine gas was introduced instead of HCl at a concentration of 45 to 72%-sec. Moisture at a concentration of 2.4%-sec. was introduced into the second curing zone. The polymer extrusion rate was 1.3 grams per minute. The take-up speed was 25 meters per minute. The spinning produced fiber having an average diameter of 18 micrometers. The fibers were continuously pyrolized under the same furnace conditions as set forth in Example 1. A good quality tow consisting of separable fibers was produced.

EXAMPLE 3

HPZ polymer was melted and degassed in a chamber before metering to the spinnerette using a melt pump at 1.2 grams per minute. The metering pump was maintained at a temperature of 220° C., and the spinnerette temperature was varied between 170°–220° C., as needed, to maintain a stable spinline. The polymer was extruded through a spinnerette containing 200, 0.35 mm diameter holes. As the polymer extruded out of the spinnerette it was cooled with nitrogen at a cross velocity of one to three feet per second. Enough nitrogen was fed near the spinnerette to maintain a linear velocity of 9 to 25 centimeters per second down the column to maintain an inert atmosphere at the exit of the spinnerette. HCl gas was injected just below this section at a concentration of about 6 to 9%-seconds and then withdrawn along with the cure gas from the second cure zone as pictured in FIG. 1. Cure gas (#2) which consisted of water vapor at 0.8 to 1.9%-seconds, was injected at the bottom of the column and flowed up at 9 to 15 centimeters per second. In the horizontal configuration of FIG. 1 the fibers were gathered into a tow with a guide and fed through a set of rollers the controlled the drawing speed at 27 meters per minute. The fibers then entered a set of furnaces where they were pyrolyzed. The first furnace was used to drive off most of the pyrolysis by-products and contained a 0.9 meter long by 76 mm. diameter tube with three separately controlled heating zones which were maintained at 650° C., 750° C. and 850° C. starting from the inlet. The nitrogen preheating oven was maintained at about 1050° C., with a nitrogen flow of 24 liters per minute. The second furnace also has three separately controlled heating zones and used the same size tube. The three zones were maintained at 1458°, 1600°, 1650° starting from the inlet.

The fibers exiting the furnaces were then, fed through rollers driven at controlled speed to allow for shrinkage of the fibers of about 30%. From the driven rollers the fiber tow was taken up on a winder with the speed determined by the fiber tension. The fibers obtained typically are of an oval cross-section. The properties of these fibers are: 1450 MPa tensile strength; 197 GPa modulus; 10.0 μm diameter; 2.53 g/cc density; and 4.8% oxygen.

EXAMPLE 4

HPZ polymer was melted and degassed in a chamber before metering to the spinnerette using a melt pump at 1.2 grams per minute. The metering pump was maintained at a temperature of 220° C., and the spinnerette temperature was varied, between 170°–220° C., as needed, to maintain a stable spinline. The polymer was extruded through a spinnerette containing 200, 0.35 mm diameter holes. As the polymer extruded out of the spinnerette it was cooled with nitrogen at a cross velocity of one to three feet per second in order to stabilize the spinline and prevent the polymer from fouling the face of the spinnerette. The spinline was enclosed with a glass shroud as shown in FIG. 1 and enough nitrogen was fed near the spinnerette to maintain a linear velocity of 9 to 25 centimeters per second down the column. This was done to maintain an inert atmosphere at the exit of the spinnerette where the fibers were drawn down. HCl cure gas was injected just below this section and would interfere with the draw down if it moved into the upper cooling zone. The HCl gas was injected and controlled at a concentration of about 6 to 9%-seconds and then withdrawn along with gas from the second cure zone as pictured in FIG. 1. Cure gas (#2) which consisted of water vapor at 0.8 to 1.9%-seconds, was injected at the bottom of the column and flowed up at 9 to 15 centimeters per second. In the horizontal configuration of FIG. 1 the fibers were gathered into a tow with a guide and fed through a set of rollers that controlled the drawing speed at 27 meters per minute. The fiber then entered a set of furnaces where they were pyrolyzed. The first furnace was used to drive off most of the pyrolysis by-products that could interfere at the higher ceramification temperatures. The first furnace contained a 0.9 meter long by 76 mm. diameter tube with three separately controlled heating zones. A 50 mm. entrance opening facilitated removal of debris that accumulated from the fiber tow. The three zones were maintained at the following ranges to yield hollow fibers: 700°–900° C. for Zone 1; 800°–950° C. for Zone 2; and 900°–1000° C. for Zone 3, starting from the inlet. The nitrogen preheating oven was maintained at about 1050°–1180° C., with a nitrogen flow 24 liters per minute. The second furnace contained a 50 cm. tube with an exit hole diameter of 20 mm. This furnace had a 30 cm. hot zone and was maintained at 1400° C.

The fiber exiting the furnaces was then fed through rollers driven at a controlled speed to allow for shrinkage of the fibers of about 30%. From the driven rollers the fiber tow was taken up on a winder with the speed determined by the fiber tension. The hollow fibers obtained typically are of a round cross-section with a hollow center. The properties of these fibers are: 1720–1990 MPa tensile strength; 138–172 GPa modulus; 11–12 μm diameter; 2.26 g/cc density; and 4–8% oxygen.

The foregoing detailed description has been given for clearness of understanding only, and no unnecessary limitations should be understood therefrom, as modification will be obvious to those skilled in the art.

That which is claimed is:

1. A method for producing filaments from a resinous organosilicon polymer, said method comprising the steps of:
    preparing a molten resinous organosilicon polymer;
    melt spinning said molten polymer into a plurality of filaments;
    rapidly curing at least the outer surfaces of said filaments;
    continuously gathering said filaments into a fiber tow; and,
    continuously pyrolyzing said fiber tow as it emerges from said gathering operation.

2. A method as recited in claim 1 wherein: said pyrolysis step is carried out in a horizontally oriented furnace and said tow is supported by tension between rollers at each end of the furnace.

3. A method as recited in claim 1 wherein: said spinning and pyrolysis steps are carried out in an inert atmosphere.

4. A method as recited in claim 1 wherein: the pyrolysis step is carried out in a vertically oriented furnace.

5. A method as recited in claim 1 wherein: the temperature within said spinning zone, consisting of a melt pump, spin pack and spinnerette is above the melting point of said polymer and below the temperature at which said molten polymer decomposes.

6. A method as recited in claim 1 wherein: said curing is carried out in an gaseous atmosphere selected from the group consisting of $Cl_2$, HCl, HBr, thionyl chloride and trichlorosilane, followed by treatment with an atmosphere containing water vapor.

7. A method as recited in claim 6 wherein: the temperature of the molten polymer introduced into said spinnerette is high enough to impart to said molten polymer a viscosity sufficiently low to permit melt spinning of the molten polymer.

8. A method as recited in claim 6 wherein: said spinning step takes place at a speed less than 100 meters per minute.

9. A method for producing filaments from a resinous hydridosilazane polymer, said method comprising the steps of:

preparing a molten resinous hydridosilazane polymer;

melt spinning said molten polymer into a plurality of filaments at a speed less than about 100 meters per minute;

rapidly curing at least the outer surfaces of said filaments by means of a chemical agent selected from the group consisting of $Cl_2$, HCl, HBr, thionyl chloride, and trichlorosilane, followed by treatment with an atmosphere containing water vapor;

continuously gathering said filaments into a fiber tow; and, continuously pyrolyzing said fiber tow as it emerges from said gathering operation.

10. A method as recited in claim 9 wherein: said pyrolysis takes places in two furnaces in an inert gaseous atmosphere, the first furnace being operated in a temperature range of about 600° to 1000° C. and the second in the range of about 1200° to 2000° C.

11. A method as recited in claim 1 wherein: said resinous organosilicon polymer is a precursor to a ceramic material consisting essentially of silicon and at least one of nitrogen and carbon.

12. A method according to claim 1 wherein the pyrolysis temperature is elevated to a level at which hollow pyrolyzed filaments are formed.

13. A method for producing a ceramic material which comprises:

(a) contacting a shaped article, made at least in part from an organo-silicon preceramic polymer, with gaseous chlorine, (b) subsequently treating said shaped article with an atmosphere containing water vapor, (c) thereafter pyrolyzing said shaped preceramic article by heating the same in an inert atmosphere at elevated temperatures.

14. A method according to claim 13 wherein said shaped article is a fiber.

15. A method according to claim 13 wherein said shaped article comprises a coating of said preceramic polymer on a substrate.

16. A method according to claim 9 wherein the water vapor is added in a section of the process equipment immediately following addition of the halogen-containing cure gas.

17. A method according to claim 9 wherein the treatment with water vapor results from passage of the fiber tow through a humid atmosphere between the time it leaves the cure column and it enters the pyrolysis furnace.

18. A hollow pyrolyzed ceramic filament produced by the process of claim 12.

19. A tow comprising hollow pyrolyzed ceramic filaments produced by the process of claim 12.

* * * * *